(12) United States Patent
Okamoto et al.

(10) Patent No.: US 10,731,872 B2
(45) Date of Patent: Aug. 4, 2020

(54) WATER HEATING SYSTEM

(71) Applicant: NORITZ CORPORATION, Hyogo (JP)

(72) Inventors: Shinichi Okamoto, Kobe (JP); Takao Muko, Kobe (JP)

(73) Assignee: NORITZ CORPORATION, Hyogo (JP)

(*) Notice: Subject to any disclaimer, the term of this patent is extended or adjusted under 35 U.S.C. 154(b) by 38 days.

(21) Appl. No.: 15/901,421

(22) Filed: Feb. 21, 2018

(65) Prior Publication Data
US 2018/0252418 A1    Sep. 6, 2018

(30) Foreign Application Priority Data

Mar. 1, 2017 (JP) ................. 2017-038328

(51) Int. Cl.
*F24D 19/10* (2006.01)
*F24H 1/14* (2006.01)
*F24H 9/20* (2006.01)
*G05B 15/02* (2006.01)
*F24H 9/12* (2006.01)

(52) U.S. Cl.
CPC ......... *F24D 19/1066* (2013.01); *F24H 1/145* (2013.01); *F24H 9/128* (2013.01); *F24H 9/2035* (2013.01); *G05B 15/02* (2013.01); *F24D 2200/043* (2013.01)

(58) Field of Classification Search
CPC ........... F24D 19/1066; F24D 2200/043; F24H 1/145; F24H 9/128; F24H 9/2035; G05B 15/02
See application file for complete search history.

(56) References Cited

U.S. PATENT DOCUMENTS

| 4,514,721 A * | 4/1985 | Shiraiwa | G07C 1/20 |
| | | | 340/500 |
| 2004/0016241 A1* | 1/2004 | Street | F25B 49/02 |
| | | | 62/129 |

(Continued)

FOREIGN PATENT DOCUMENTS

| JP | H07-135693 A | 5/1995 |
| JP | 2003296145 A | * 10/2003 |

(Continued)

*Primary Examiner* — Thomas C Lee
*Assistant Examiner* — Michael Tang
(74) *Attorney, Agent, or Firm* — Studebaker & Brackett PC

(57) ABSTRACT

A water heating system includes a plurality of water heaters of which exhaust paths are connected in common to an exhaust path assembly, a control device configured for centralized control of the plurality of water heaters, and a non-volatile storage unit. The plurality of water heaters include control units configured to control hot water supply operations based on communication with the control device, respectively. The storage unit is configured to store information on the water heater of which control unit is recorded to have established communication with the control device. The control device turns off all of the plurality of water heaters when information on the water heater of which control unit has currently established communication with the control device does not match with the information stored in the storage unit.

6 Claims, 11 Drawing Sheets

(56) References Cited

U.S. PATENT DOCUMENTS

| | | | | |
|---|---|---|---|---|
| 2004/0176858 A1* | 9/2004 | Kuwahara | ............... | G05B 15/02 |
| | | | | 700/9 |
| 2006/0049268 A1* | 3/2006 | Weimer | ................. | F23N 3/082 |
| | | | | 236/51 |
| 2009/0171472 A1* | 7/2009 | Teranisi | .................... | G05B 9/03 |
| | | | | 700/3 |
| 2010/0209106 A1* | 8/2010 | Sugawara | ............ | H04B 10/275 |
| | | | | 398/59 |
| 2011/0035632 A1* | 2/2011 | Hong | ................. | G06F 11/0745 |
| | | | | 714/55 |
| 2014/0126582 A1* | 5/2014 | Premke | ................ | H04L 12/403 |
| | | | | 370/431 |
| 2016/0002892 A1* | 1/2016 | Aizawa | ................. | E02F 9/2292 |
| | | | | 701/99 |
| 2016/0123585 A1* | 5/2016 | Okamoto | ................ | F23L 17/00 |
| | | | | 110/188 |
| 2017/0359241 A1* | 12/2017 | Takada | ................ | H04L 12/4625 |

FOREIGN PATENT DOCUMENTS

| | | | |
|---|---|---|---|
| JP | 3687512 B2 | | 8/2005 |
| JP | 2016-114273 A | | 6/2016 |
| JP | 2016114273 A | * | 6/2016 |

* cited by examiner

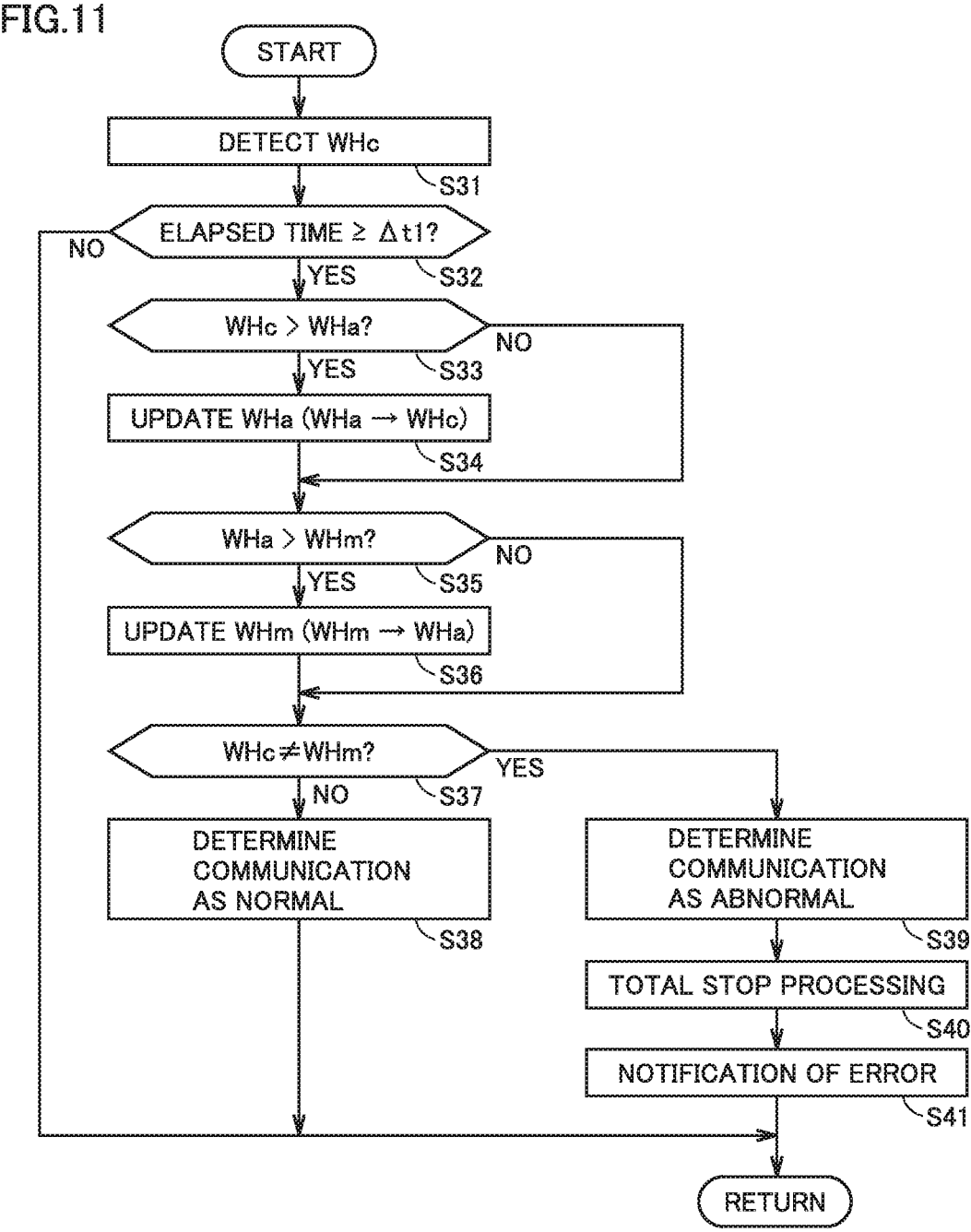

WATER HEATING SYSTEM

BACKGROUND OF THE INVENTION

Field of the Invention

This invention relates to a water heating system and particularly to a water heating system in which a plurality of water heaters are operated as being linked to one another.

Description of the Background Art

A water heating system in which a plurality of water heaters are operated as being linked (which is hereinafter also referred to as a linked water heating system) has been known (see, for example, Japanese Patent No. 3687512, Japanese Patent Laying-Open No. 2016-114273, and Japanese Patent Laying-Open No. 7-135693). In the linked water heating system, a control device which controls a plurality of water heaters in a centralized manner and a control unit which controls each water heater are connected to bidirectionally communicate with each other. As the control device communicates with the control unit of each water heater, control for increasing and decreasing the number of operating water heaters in accordance with an amount of hot water supply (control of the number of operating water heaters) is carried out.

When such an abnormal condition in communication as failure in communication between the control device and the control unit of any water heater of the plurality of water heaters occurs in such a linked water heating system, control of the number of operating water heaters may fail. Therefore, the control device has a function to monitor a state of communication with the control unit of each water heater and it is configured to turn off the water heating system when the abnormal condition in communication is sensed.

SUMMARY OF THE INVENTION

In the linked water heating system described above, normally, upon turn-on of the water heating system, monitoring of a state of communication is started. The control device can determine, as the number of installed water heaters, the number of water heaters corresponding to control units which are able to communicate, by exchanging a specific signal with the control unit of each water heater.

When failure in communication with a control unit of a certain water heater has occurred at the time point of turn-on of the water heating system, however, the control device is unable to recognize presence of such a water heater and may incorrectly determine the number of installed water heaters. Consequently, operations of the water heating system may be started with an abnormal condition in communication being maintained.

Some linked water heating systems have adopted what is called a common vent type configured to connect an exhaust path of each water heater in common to an exhaust path assembly and to emit exhaust generated in each water heater to the exhaust path assembly by using a fan in the water heater.

In a common vent type linked water heating system, while at least one water heater is performing a combustion operation, fans of remaining water heaters in a non-combusting state are rotated. A backflow of exhaust in an exhaust path assembly to water heaters in the non-combusting state is thus prevented. Therefore, when the abnormal condition in communication described above occurs, it becomes difficult to have the fan of the water heater normally rotate. Consequently, in addition to failure in control of the number of operating water heaters, exhaust may flow back from the exhaust path assembly. Therefore, reliable sensing of an abnormal condition in communication is strongly demanded.

This invention was made to solve such problems, and an object of this invention is to provide a water heating system which can reliably sense an abnormal condition in communication between a control device which controls a plurality of water heaters in a centralized manner and a control unit of each water heater.

According to one aspect of the present invention, a water heating system includes a plurality of water heaters of which exhaust paths are connected in common to an exhaust path assembly, a control device configured for centralized control of the plurality of water heaters, and a non-volatile storage unit accessible from the control device. Each of the plurality of water heaters includes a control unit configured to control a hot water supply operation based on communication with the control device. The storage unit is configured to store information on a water heater of which control unit is recorded to have established communication with the control device. The control device turns off all of the plurality of water heaters when information on a water heater of which control unit has currently established communication with the control device does not match with the information stored in the storage unit.

According to the water heating system, even when an abnormal condition in communication has already occurred by the time of turn-on of the water heating system, the control device can sense the abnormal condition in communication by monitoring a state of communication between the control device and the control unit of each water heater by using information on the water heater with which establishment of communication has been recorded which is stored in the storage unit in a non-volatile manner. Therefore, by reliably sensing the abnormal condition in communication and turning off all of the plurality of water heaters, failure in control of the number of operating water heaters and a backflow of exhaust from the exhaust path assembly can be prevented. Consequently, reliability and safety of the common vent type linked water heating system can be improved.

Preferably, the storage unit is configured to store information on the number of water heaters of which control units are recorded to have established communication with the control device. The control device turns off all of the plurality of water heaters when the number of water heaters of which control units have currently established communication with the control device is smaller than the number stored in the storage unit.

By doing so, a state of communication between the control device and the control unit of each water heater is monitored by using the number of water heaters stored in the storage unit in a non-volatile manner. Therefore, even when an abnormal condition in communication has already occurred by the time of turn-on of the water heating system, the abnormal condition in communication can be sensed. Therefore, since an abnormal condition in communication can reliably be sensed, reliability and safety of the water heating system can be improved.

Preferably, the storage unit is configured to store information for identifying the water heater of which control unit is recorded to have established communication with the control device. The control device turns off all of the plurality of water heaters when the water heater of which control unit has currently established communication with the control device does not match with the water heater stored in the storage unit.

By doing so, a state of communication between the control device and the control unit of each water heater is monitored by using the information for identifying the water heater stored in the storage unit in a non-volatile manner. Therefore, even when an abnormal condition in communication has already occurred by the time of turn-on of the water heating system, the abnormal condition in communication can be sensed. Therefore, since an abnormal condition in communication can reliably be sensed, reliability and safety of the water heating system can be improved.

Preferably, the water heating system further includes an operation portion configured to accept an external operation instruction. When the operation portion accepts a first operation instruction, the control device prohibits turn-off of all of the plurality of water heaters based on unmatch of the information on the water heater of which control unit has currently established communication with the control device with the information stored in the storage unit.

By doing so, when a maintenance work of any of the plurality of water heaters is required while the water heating system is on, a serviceperson outputs a first operation instruction to the control device through the operation portion so that erroneous sensing of an abnormal condition of communication during the work and turn-off of operations of the plurality of water heaters can be prevented. Therefore, the maintenance work can be done without turning off the water heating system.

Preferably, the control device is configured to cancel such prohibition when a prescribed period of time has elapsed since acceptance of the first operation instruction by the operation portion. When the operation portion accepts a second operation instruction while the control device prohibits stop of all operations of the plurality of water heaters, the control device further changes the prescribed period of time in response to the second operation instruction.

By doing so, even though a serviceperson fails to give an operation instruction to cancel prohibition of communication monitoring processing after completion of the work, the water heating system can automatically return to the communication monitoring processing. A duration of prohibition of the communication monitoring processing can be adjusted in accordance with progress of the work and prohibition is automatically canceled when the adjusted period elapses. Therefore, convenience of the serviceperson can be improved.

Preferably, the water heating system further includes an operation portion configured to accept an external operation instruction. When the operation portion accepts a third operation instruction, the control device updates the information stored in the storage unit to the information on the water heater of which control unit has currently established communication with the control device.

By doing so, when the number of water heaters to be used is desirably decreased in the water heating system, the information stored in the storage unit can be rewritten to information representing the decreased number of water heaters to be used. Since determination as to an abnormal condition in communication can thus be made based on the updated information, the water heating system can be prevented from being erroneously turned off.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a flowchart for illustrating the communication monitoring processing performed by the system controller of the water heating system according to the fourth embodiment.

DESCRIPTION OF THE PREFERRED EMBODIMENTS

Figure 1:
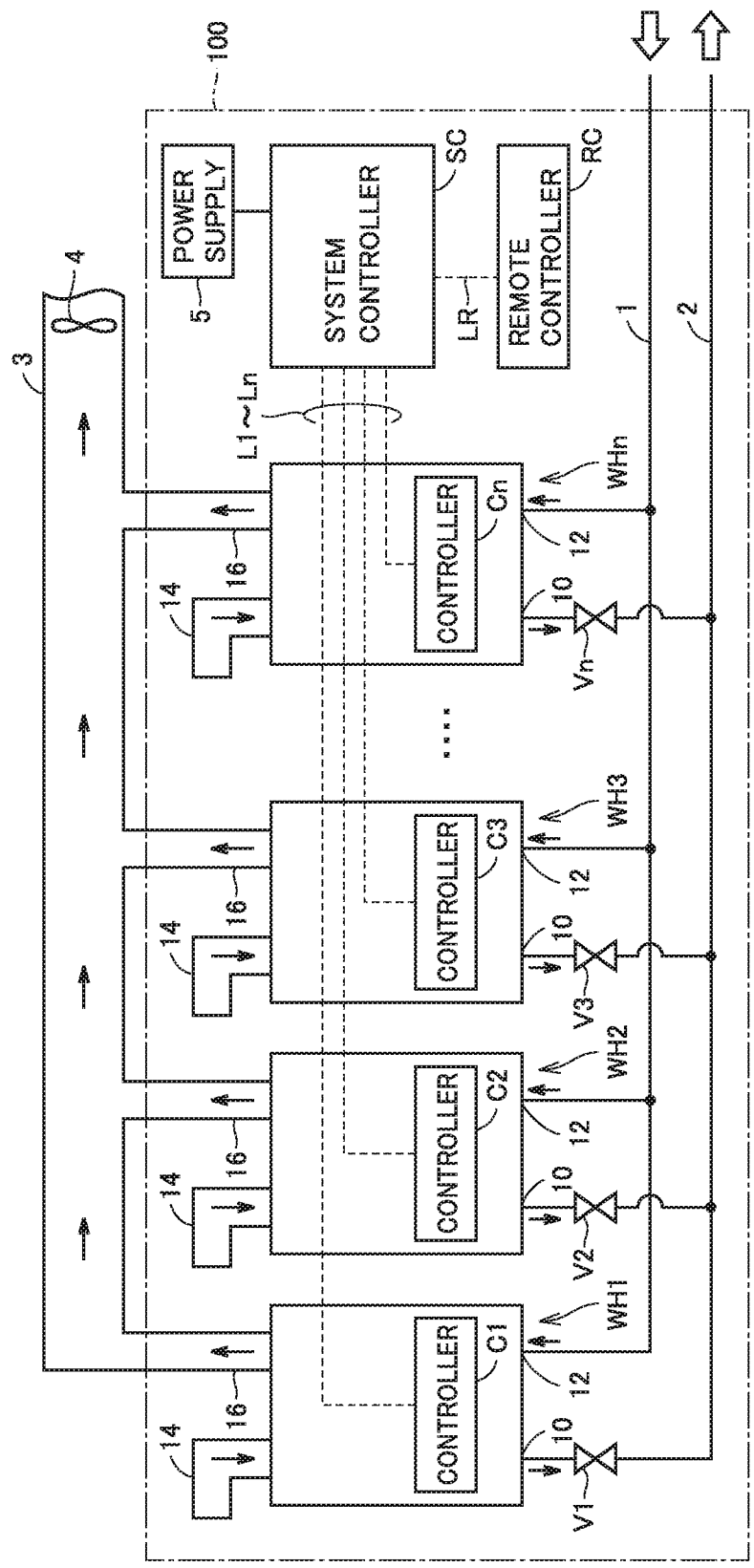
FIG. 1 is a schematic configuration diagram of a water heating system according to a first embodiment of this invention.

Embodiments of the present invention will be described in detail with reference to the drawings. The same or corresponding elements in the drawings have the same reference characters allotted and description thereof will not be repeated.

First Embodiment (Configuration of Water Heating System)

FIG. 1 is a schematic configuration diagram of a water heating system according to a first embodiment of this invention. A water heating system 100 according to the present embodiment can be applied to a linked water heating system in which a plurality of water heaters are operated as being linked.

Referring to FIG. 1, water heating system 100 includes a plurality of water heaters WH1 to WHn (n being an integer not smaller than two), a water supply pipe 1 for supplying water to each water heater, a hot water supply pipe 2 for sending water and/or hot water from each water heater, a plurality of valves V1 to Vn, a system controller SC, a remote controller RC, and a power supply 5. Water heaters WH1 to WHn are collectively called a water heater WH below. Valves V1 to Vn are collectively called a valve V.

Water heaters WH1 to WHn are connected in parallel with respect to water supply pipe 1. Water supply pipe 1 receives supply of water from a water supply and supplies water to a water inlet 12 of each water heater WH. Water heaters WH1 to WHn are further connected in parallel to hot water supply pipe 2. Water heaters WH1 to WHn are linked to one another with water supply pipe 1 and hot water supply pipe 2 being interposed.

Valves V1 to Vn are connected between respective hot water outlets 10 of water heaters WH1 to WHn and hot water supply pipe 2. Valve V is implemented, for example, by an electromagnetic valve. Valve V may be provided in water heater WH. Valve V does not have to be provided if a water amount servo valve and a bypass flow rate regulation valve (see FIG. 2) provided in water heater WH have a full closing function.

Water heater WH has an air supply duct 14 and an exhaust duct 16. Air supply duct 14 is used for taking air in a room where water heating system 100 is installed into water heater WH. Exhaust duct 16 is used for emitting exhaust generated in water heater WH.

Exhaust duct 16 of water heater WH is connected to an exhaust duct assembly 3 installed outdoors. Exhaust duct assembly 3 is constructed to collectively guide exhaust from water heaters WH1 to WHn. An external fan 4 is provided in exhaust duct assembly 3. As external fan 4 is rotated, the exhaust in exhaust duct assembly 3 is emitted outdoors. Drive of external fan 4 is controlled by system controller SC.

Water heaters WH1 to WHn have controllers C1 to Cn, respectively. Controllers C1 to Cn are connected to system controller SC through respective communication lines L1 to Ln. Controllers C1 to Cn are hereinafter collectively called a controller C. Communication lines L1 to Ln are collectively called a communication line L. Communication line L may be wired or wireless.

System controller SC is mainly implemented by a microcomputer including a central processing unit (CPU) and a memory such as a read only memory (ROM) and a random access memory (RAM) by way of example. System controller SC controls water heaters WH1 to WHn in a centralized manner by execution of a program stored in the memory by the CPU.

Specifically, system controller SC bidirectionally communicates with controller C of each water heater WH through communication line L. System controller SC has each water heater WH start and stop combustion by transmitting a control command based on control of the number of operating water heaters which will be described later to controller C of each water heater WH. System controller SC controls opening and closing of valves V1 to Vn.

System controller SC is further connected to remote controller RC through a communication line LR. Remote controller RC is used as an operation portion for accepting an external operation instruction. The operation instruction includes a command relating to a hot water supply operation such as a command to turn on and off an operation of water heating system 100 and a command to set a temperature of hot water. The operation instruction further includes a command relating to a maintenance work of water heating system 100. Remote controller RC is used for notifying a user of a state of operation of water heating system 100.

In the present first embodiment, system controller SC corresponds to one embodied example of the "control device" and controller C corresponds to one embodied example of the "control unit." Though system controller SC is configured to be provided outside water heaters WH1 to WHn in the example in FIG. 1, system controller SC may be provided in any water heater WH.

(Configuration of Water Heater)

A configuration of water heater WH shown in FIG. 1 will now be described.

Figure 2:
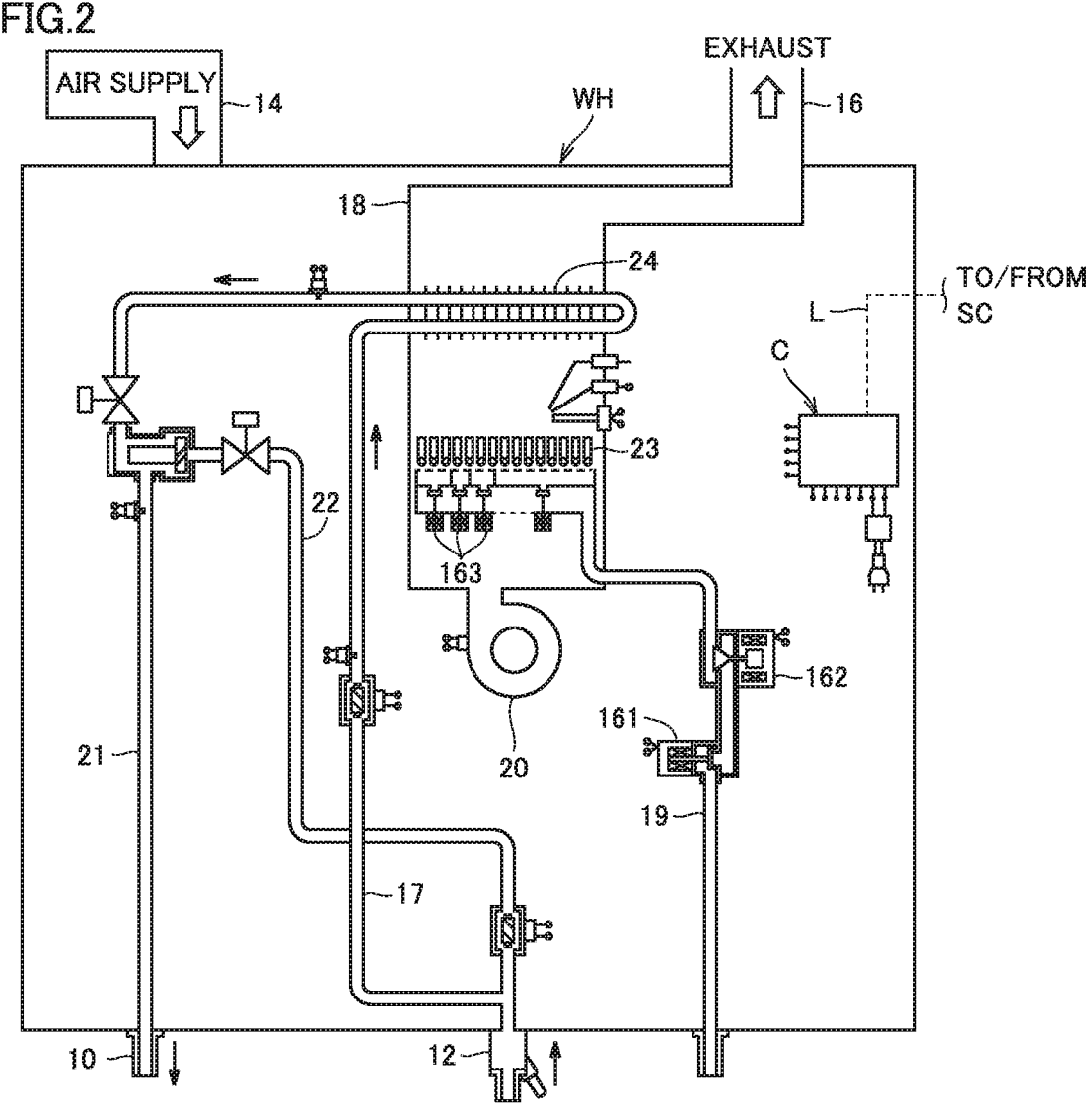
FIG. 2 is a diagram showing a detailed configuration of a water heater shown in FIG. 1.

FIG. 2 is a diagram showing a detailed configuration of water heater WH shown in FIG. 1. Referring to FIG. 2, water heater WH includes a water entry pipe 17, a combustion unit 18, a gas supply pipe 19, a fan 20, a hot water delivery pipe 21, a bypass pipe 22, air supply duct 14, exhaust duct 16, and controller C.

Water entry pipe 17 is used for sending water from water inlet 12 to combustion unit 18. An incoming water flow rate sensor and an incoming water temperature sensor which measure a flow rate and a temperature of incoming water, respectively, are provided in water entry pipe 17.

Combustion unit 18 includes a burner 23 and a heat exchanger 24. Burner 23 burns a fuel during a hot water supply operation. Heat exchanger 24 exchanges heat between a combustion exhaust generated as a result of a combustion operation by burner 23 and water and/or hot water supplied through water entry pipe 17. Water and/or hot water which flows through heat transfer pipes in heat exchanger 24 is thus heated.

Gas supply pipe 19 supplies fuel gas to burner 23. A main gas electromagnetic valve 161 and a gas proportional valve 162 for regulating an amount of supply of gas to burner 23 as well as a plurality of combustion control valves 163 are provided in gas supply pipe 19.

Fan 20 is activated during combustion by burner 23 and sends air for combustion to burner 23. Fan 20 emits exhaust produced as a result of combustion by burner 23 to exhaust duct 16.

Hot water delivery pipe 21 is used for sending water and/or hot water heated by heat exchanger 24 to hot water outlet 10. An outgoing hot water temperature sensor which measures a temperature of water and/or hot water output from heat exchanger 24, a water amount servo valve, a water and/or hot water mixing valve, a hot water supply temperature sensor which measures a temperature of water and/or hot water sent through hot water outlet 10, and a bypass flow rate regulation valve are provided in hot water delivery pipe 21.

Bypass pipe 22 is used to mix water with water and/or hot water sent from heat exchanger 24. A bypass flow rate sensor is provided in bypass pipe 22.

Air supply duct 14 is used to send air in a room into water heater WH. Exhaust duct 16 is used to emit exhaust generated in water heater WH to exhaust duct assembly 3.

Controller C bidirectionally communicates with system controller SC through communication line L. Controller C controls each portion in water heater WH including burner 23 and fan 20 in response to a control command given from system controller SC based on outputs from various sensors. The control command includes a command for indicating start and stop of a hot water supply operation and a command for indicating a condition for operation (a target temperature of hot water supply). Controller C transmits a state of operation of water heater WH to system controller SC.

(Control Configuration of Water Heating System)

A control configuration of water heating system 100 will now be described.

Figure 3:
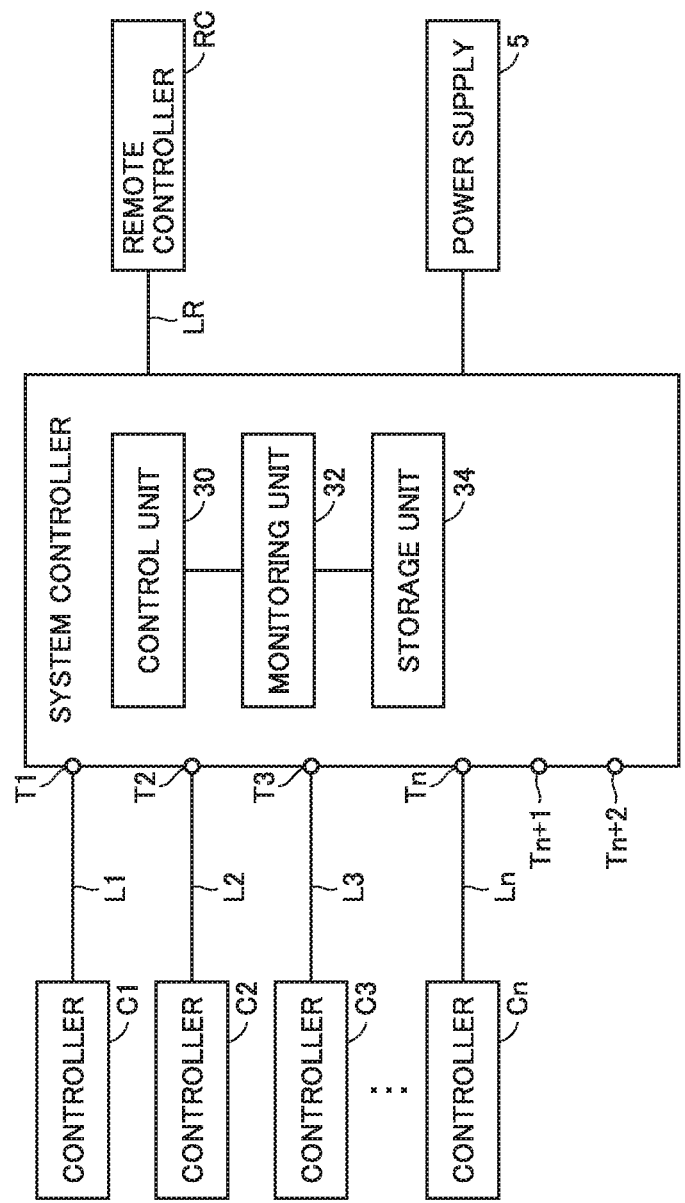
FIG. 3 is a block diagram showing a control configuration of the water heating system according to the first embodiment.

FIG. 3 is a block diagram showing a control configuration of water heating system 100. Referring to FIG. 3, system controller SC has a control unit 30, a monitoring unit 32, and a storage unit 34.

Control unit 30 has a plurality of terminals T1 to Tn+2. Controllers C1 to Cn of water heaters WH1 to WHn are connected to n terminals T1 to Tn of the plurality of terminals T1 to Tn+2 through communication lines L1 to Ln, respectively. Terminals Tn+1 and Tn+2 are open.

Control unit 30 is configured to control the number of operating water heaters in coordination with controller C of each water heater WH. Control of the number of operating water heaters refers to control for determining the number of operating water heaters WH in accordance with a load and for setting unnecessary water heater WH to an inactive state based on the determination. A control technique well known for the linked water heating system can be applied to control of the number of operating water heaters. The number of operating water heaters is controlled during a hot water supply operation in water heating system 100. The hot water supply operation is turned on by an operation of a switch in remote controller RC (switch ON and OFF of the operation) and started when water supply to water heater WH in a quantity equal to or greater than a prescribed minimum operation quantity of working water is detected.

When a hot water supply operation of water heating system 100 is started, system controller SC determines the number of water heaters WH (which are hereinafter also referred to as combusting water heaters) which perform the hot water supply operation in accordance with a required amount of hot water supply and selects combusting water heaters based on the determined number of water heaters. System controller SC transmits a start command for instructing controller C of the combusting water heater to start the hot water supply operation.

System controller SC further switches valve V corresponding to the combusting water heater from a closed state to an open state. Water and/or hot water heated in a combustion operation by the combusting water heater is thus supplied from a hot water supply faucet. Valve V may be controlled by controller C to open and close in response to a start command and a stop command from system controller SC for each water heater WH.

System controller SC transmits a temperature of hot water supply set in remote controller RC as a target temperature of hot water supply to controller C of the combusting water heater. Controller C of the combusting water heater controls an amount of combustion by burner 23 so as to set a temperature of outgoing hot water to a target temperature of hot water supply and has fan 20 rotate at a rotation speed corresponding to the amount of combustion.

When the total sum of amounts of outgoing hot water from all combusting water heaters is close to the total sum of upper limits of capacities of all combusting water heaters, system controller SC instructs one of water heaters WH of which hot water supply operation is stopped (which are hereinafter also referred to as non-combusting water heaters) to start the hot water supply operation. System controller SC transmits a start command and a target temperature of hot water supply to controller C of the non-combusting water heater and switches valve V corresponding to the non-combusting water heater from the closed state to the open state.

When an amount of supply of hot water decreases while two or more combusting water heaters are operating, system controller SC transmits a stop command to one combusting water heater and switches valve V corresponding to the combusting water heater from the open state to the closed state.

While the number of operating water heaters described above is being controlled, system controller SC also has fan 20 of a non-combusting water heater rotate. Specifically, system controller SC issues a command only to rotate fan 20 together with a command to stop the hot water supply operation to controller C of water heater WH selected as a non-combusting water heater. In response to the command, controller C has fan 20 rotate, so that a pressure in a non-combusting water heater can be regulated not to be lower than a pressure in exhaust duct assembly 3. A backflow from exhaust duct assembly 3 can thus be prevented.

According to such a configuration, however, when an abnormal condition in communication between controller C of any of the plurality of water heaters WH1 to WHn and system controller SC occurs, it becomes difficult to normally control the number of operating water heaters described above. Since fan 20 of a non-combusting water heater cannot normally be rotated, a backflow of exhaust from exhaust duct assembly 3 may occur.

In order to prevent such a situation, monitoring unit 32 monitors a state of communication between system controller SC and controller C of each water heater WH. Monitoring unit 32 monitors a state of communication from turn-on until turn-off of power supply 5 (see FIG. 1) of water heating system 100. Details of communication monitoring processing will be described later.

Monitoring unit 32 performs processing for turning off all water heaters WH1 to WHn (hereinafter also referred to as total stop processing) when an abnormal condition in communication is sensed. The total stop processing includes processing for stopping an operation of a combusting water heater and processing for stopping rotation of a fan in a non-combusting water heater. Failure in control of the number of operating water heaters or a backflow of exhaust from exhaust duct assembly 3 can thus be prevented. Specifically, in total stop processing, system controller SC directs a combusting water heater to stop the hot water supply operation and maintains a non-combusting water heater in the turned-off state. Whether or not the command actually reaches the water heater which has failed in communication does not matter. The total stop processing may be configured not to include processing for stopping rotation of a fan in a non-combusting water heater.

(Communication Monitoring Processing)

Communication monitoring processing performed by system controller SC will now be described.

Monitoring unit 32 monitors a state of communication based on exchange of a specific signal between system controller SC and each controller C. Specifically, monitoring unit 32 has signals for checking connection transmitted every prescribed cycle from terminals T1 to Tn+2 of system controller SC. Monitoring unit 32 does monitoring for response signals to the signals which are transmitted to terminals T1 to Tn+2, for a certain period of time since transmission of the signals. The certain period of time is set, for example, to approximately two minutes.

When response signals are received within the certain period of time, monitoring unit 32 can determine that communication with controllers C which are senders of the response signals has been established.

In contrast, when a response signal cannot be received within the certain period of time, such a situation falls under (1) a condition that terminal T which is a sender of the signal for checking connection is open (that is, controller C of water heater WH is not connected to terminal T) or (2) a condition that, in spite of connection of controller C to terminal T, communication with controller C has failed (that is, an abnormal condition in communication has occurred).

Therefore, it is not easy to determine which of conditions (1) and (2) is applicable based on reception of a response signal.

Therefore, for example, when the condition (2) has already been satisfied by the time of turn-on of water heating system 100, determination as the condition (1) may erroneously be made. Consequently, an operation of water heating system 100 may be started with the abnormal condition in communication being maintained.

In the present first embodiment, monitoring unit 32 is configured to monitor a state of communication between system controller SC and controller C of each water heater WH by using information stored in storage unit 34 (see FIG. 3).

Storage unit 34 is implemented by a non-volatile memory such as a ROM or a flash memory. Storage unit 34 is accessible from monitoring unit 32 and configured to store information on water heater WH of which controller C is recorded to have established communication with system controller SC.

When information on water heater WH with which communication has currently been established does not match with information stored in storage unit 34, monitoring unit 32 determines that an abnormal condition in communication has occurred between system controller SC and controller C of any water heater WH.

Monitoring unit 32 can obtain information on the number of water heaters WH with which communication has currently been established as information on water heater WH with which communication has currently been established. Alternatively, monitoring unit 32 can obtain information for identifying water heater WH with which communication has currently been established as information on water heater WH with which communication has currently been established.

Figure 4:
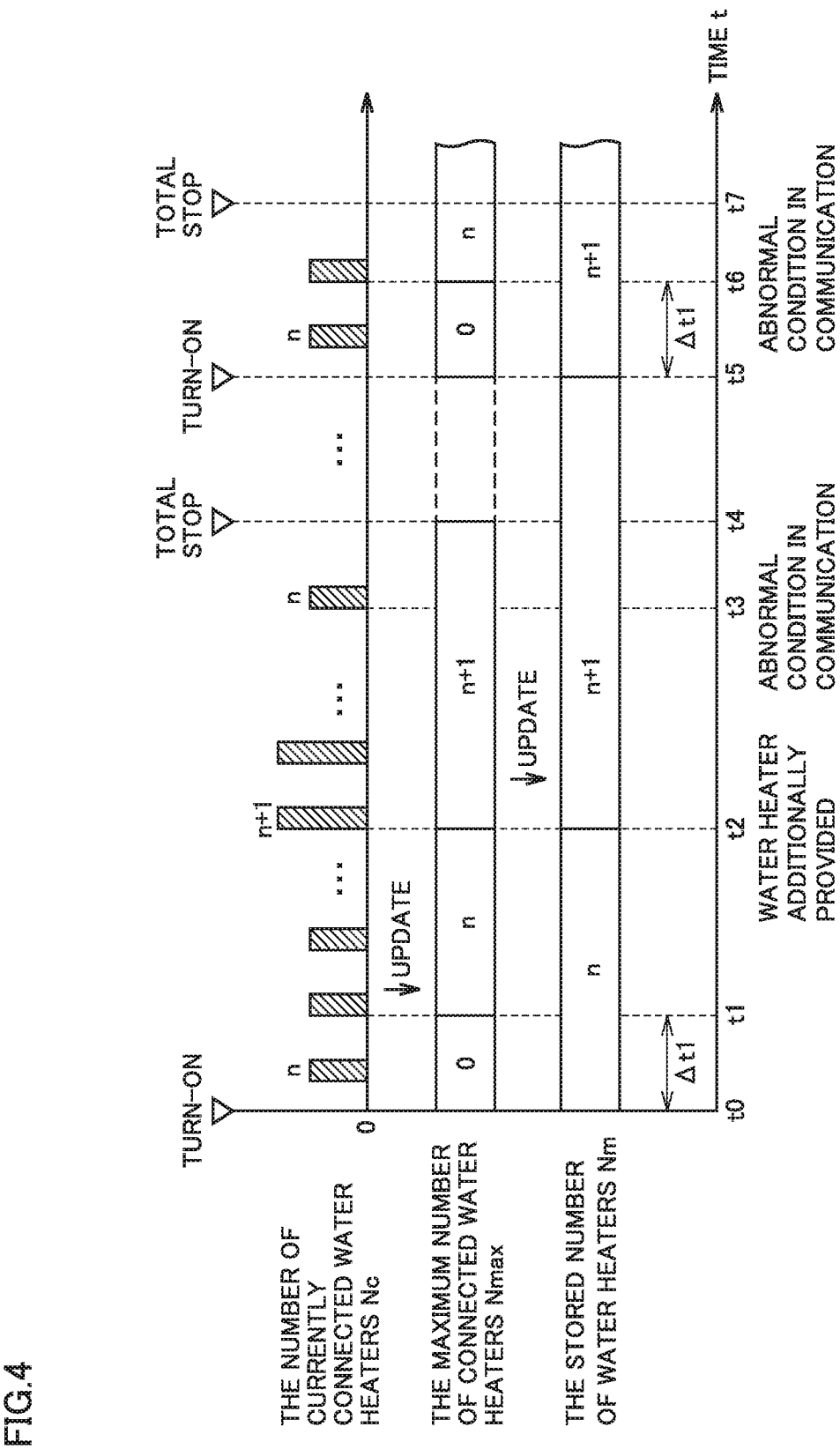
FIG. 4 is a time chart for illustrating communication monitoring processing performed by a system controller of the water heating system according to the first embodiment.

FIG. 4 is a time chart for illustrating communication monitoring processing performed by system controller SC. Referring to FIG. 4, when water heating system 100 is turned on at time to, supply of electric power to system controller SC and controller C of each water heater WH is started. When system controller SC and controllers C1 to Cn are started up, system controller SC and each of controllers C1 to Cn can bidirectionally communicate with each other.

In the present first embodiment, monitoring unit 32 is assumed to detect the number of water heaters WH with which communication has currently been established based on the number of response signals received at terminals T1 to Tn+2 every prescribed cycle. In the description below, the number of water heaters WH with which communication has currently been established is denoted as "the number of currently connected water heaters Nc."

In the example in FIG. 1, n water heaters WH1 to WHn are connected to system controller SC. Therefore, a maximum value of the number of currently connected water heaters Nc is defined as n. A value of the number of currently connected water heaters Nc is initialized (Nc=0) at time t0 when water heating system 100 is turned on.

Monitoring unit 32 sets the greatest number of currently connected water heaters Nc periodically detected every prescribed cycle as "the maximum number of connected water heaters Nmax." A value of the maximum number of connected water heaters Nmax is initialized (Nmax=0) at time t0.

As shown in FIG. 4, the number of currently connected water heaters Nc is maintained at a value "n" at time t0 or later. Therefore, the maximum number of connected water heaters Nmax is updated from "0" to "n". The maximum number of connected water heaters Nmax, however, is not updated until lapse of a prescribed period of time Δt1 from turn-on. This is because a state of communication between system controller SC and each controller C is unstable at the time of start-up of water heating system 100 and hence the number of currently connected water heaters Nc tends to vary. Prescribed period of time Δt1 is set, for example, to approximately five minutes.

At time t1 after lapse of prescribed period of time Δt1 since time t0, monitoring unit 32 updates the maximum number of connected water heaters Nmax from the initial value "0" to "n" representing the maximum value of the number of currently connected water heaters Nc. Monitoring unit 32 has storage unit 34 store the maximum number of connected water heaters Nmax. In the description below, the maximum number of connected water heaters Nmax stored in storage unit 34 is denoted as "the stored number of water heaters Nm." Similarly to the maximum number of connected water heaters Nmax, the stored number of water heaters Nm is not updated until lapse of prescribed period of time Δt1 since turn-on.

As described above, storage unit 34 is implemented by a non-volatile memory. Therefore, by the time of turn-on, storage unit 34 has saved the maximum number of connected water heaters Nmax at the time point of previous turn-off as the stored number of water heaters Nm. Upon turn-on, monitoring unit 32 reads the stored number of water heaters Nm from storage unit 34.

Monitoring unit 32 can check certainty of the read stored number of water heaters Nm. For example, the stored number of water heaters Nm can be written in each of two storage areas in storage unit 34. By comparing the two stored numbers of water heaters Nm read from the two storage areas with each other, whether or not the stored number of water heaters Nm is normal can be checked.

In the example in FIG. 4, the stored number of water heaters Nm read from storage unit 34 at time t0 is normal and a value thereof is "n". Therefore, the stored number of water heaters Nm is not updated at time t1 but maintained at the value n. When the stored number of water heaters Nm at time t0 is not normal, monitoring unit 32 has remote controller RC give a notification of an error indicating an abnormal condition of storage unit 34 and performs total stop processing.

An example in which one water heater WH is additionally provided in water heating system 100 at time t2 after time t1 is assumed. In this case, system controller SC has an (n+1)th terminal Tn+1 (see FIG. 3) connected to a controller Cn+1 of a water heater WHn+1 through a communication line Ln+1.

When the specific signal described above is exchanged by means of monitoring unit 32 in this state, the number of currently connected water heaters Nc increases from "n" to "n+1" in response to reception of a response signal at terminal Tn+1. Therefore, the maximum number of connected water heaters Nmax also increases from "n" to "n+1".

Monitoring unit 32 compares the maximum number of connected water heaters Nmax with the stored number of water heaters Nm stored in storage unit 34. When the maximum number of connected water heaters Nmax is greater than the stored number of water heaters Nm (Nmax>Nm), monitoring unit 32 updates the stored number of water heaters Nm to the maximum number of connected water heaters Nmax. Since relation of Nmax>Nm is satisfied at time t2 in the example in FIG. 4, the stored number of water heaters Nm is updated from "n" to "n+1".

In FIG. 4, such an abnormal condition in communication as failure in communication with controller C of one water heater WH among water heaters WH1 to WHn+1 occurs at time t3 after time t2. The number of currently connected water heaters Nc thus decreases from "n+1" to "n" at time t3.

Since the maximum value of the number of currently connected water heaters Nc is "n+1" at time t3, the maximum number of connected water heaters Nmax remains at a value "n+1." Since relation of Nmax>Nm is not satisfied, the stored number of water heaters Nm remains at the value "n+1".

Thus, when water heating system 100 is turned on, the number of currently connected water heaters Nc is detected by establishing communication every prescribed cycle, and the maximum number of connected water heaters Nmax is updated when the detected number of currently connected water heaters Nc increases (time t2). The maximum number of connected water heaters Nmax represents the number of water heaters WH with which establishment of communication has been recorded.

Storage unit 34 has a function to store in a non-volatile manner, the number of water heaters WH with which establishment of communication has been recorded. Therefore, the stored number of water heaters Nm read from storage unit 34 at the time of turn-on (time t0) represents the number of water heaters WH with which establishment of communication has been recorded before turn-on.

When the maximum number of connected water heaters Nmax exceeds the stored number of water heaters Nm after turn-on, the stored number of water heaters Nm is updated to the maximum number of connected water heaters Nmax. When the number of water heaters WH with which establishment of communication has been recorded increases, the number of water heaters WH with which establishment of communication has been recorded is rewritten in storage unit 34.

Monitoring unit 32 monitors a state of communication between system controller SC and controller C of each water heater WH based on the number of currently connected water heaters Nc, the maximum number of connected water heaters Nmax, and the stored number of water heaters Nm.

Specifically, monitoring unit 32 compares the number of currently connected water heaters Nc and the maximum number of connected water heaters Nmax with each other. When the number of currently connected water heaters Nc is smaller than the maximum number of connected water heaters Nmax (Nc<Nmax), monitoring unit 32 determines that an abnormal condition in communication has occurred between system controller SC and controller C of any water heater WH. When the number of currently connected water heaters Nc is smaller than the maximum number of connected water heaters Nmax (Nc<Nmax), it indicates that an abnormal condition in communication has occurred in any of Nmax water heaters WH with which communication was established.

Monitoring unit 32 further compares the maximum number of connected water heaters Nmax and the stored number of water heaters Nm with each other. When the maximum number of connected water heaters Nmax is smaller than the stored number of water heaters Nm (Nmax<Nm), monitoring unit 32 determines that an abnormal condition in communication has occurred between system controller SC and controller C of any water heater WH.

When the maximum number of connected water heaters Nmax is smaller than the stored number of water heaters Nm (Nmax<Nm), it indicates that the number of water heaters WH with which establishment of communication has been recorded after turn-on is smaller than the number of water heaters WH with which establishment of communication has been recorded before turn-on. This means that an abnormal condition in communication occurred at the time point of turn-on in any of Nm water heaters WH with which communication had been established before turn-on.

Thus, consequently, when the number of currently connected water heaters Nc is smaller than the stored number of water heaters Nm (Nc<Nm), it is determined that an abnormal condition in communication has occurred between system controller SC and controller C of any water heater WH.

Since the maximum number of connected water heaters Nmax and the stored number of water heaters Nm are not updated until lapse of prescribed period of time Δt1 since turn-on, monitoring unit 32 makes determination as to an abnormal condition in communication described above on condition that prescribed period of time Δt1 or longer has elapsed since turn-on.

In the example in FIG. 4, relation of Nc<Nmax (that is, Nc<Nm) is satisfied at time t3. Therefore, monitoring unit 32 determines that an abnormal condition in communication has occurred and performs the total stop processing (time t4). When water heating system 100 is again turned on at time t5 after time t4, the stored number of water heaters Nm is read from storage unit 34. The maximum number of connected water heaters Nmax is updated at time t6 after lapse of prescribed period of time Δt1 since time t5.

At time t6 or later, monitoring unit 32 again monitors a state of communication between system controller SC and controller C of each water heater WH based on the number of currently connected water heaters Nc, the maximum number of connected water heaters Nmax, and the stored number of water heaters Nm. Since relation of Nmax<Nm (that is, Nc<Nm) is satisfied at time t6 in the example in FIG. 4, monitoring unit 32 determines that an abnormal condition in communication has occurred and performs the total stop processing (time t7).

As described above, monitoring unit 32 monitors a state of communication between system controller SC and controller C of each water heater WH by using the stored number of water heaters Nm stored in storage unit 34 in a non-volatile manner. Therefore, even when an abnormal condition in communication has already occurred by the time of turn-on of water heating system 100, the abnormal condition in communication can be sensed. Therefore, since an abnormal condition in communication between system controller SC and controller C of each water heater WH can reliably be sensed, reliability and safety of water heating system 100 can be improved.

Figure 5:
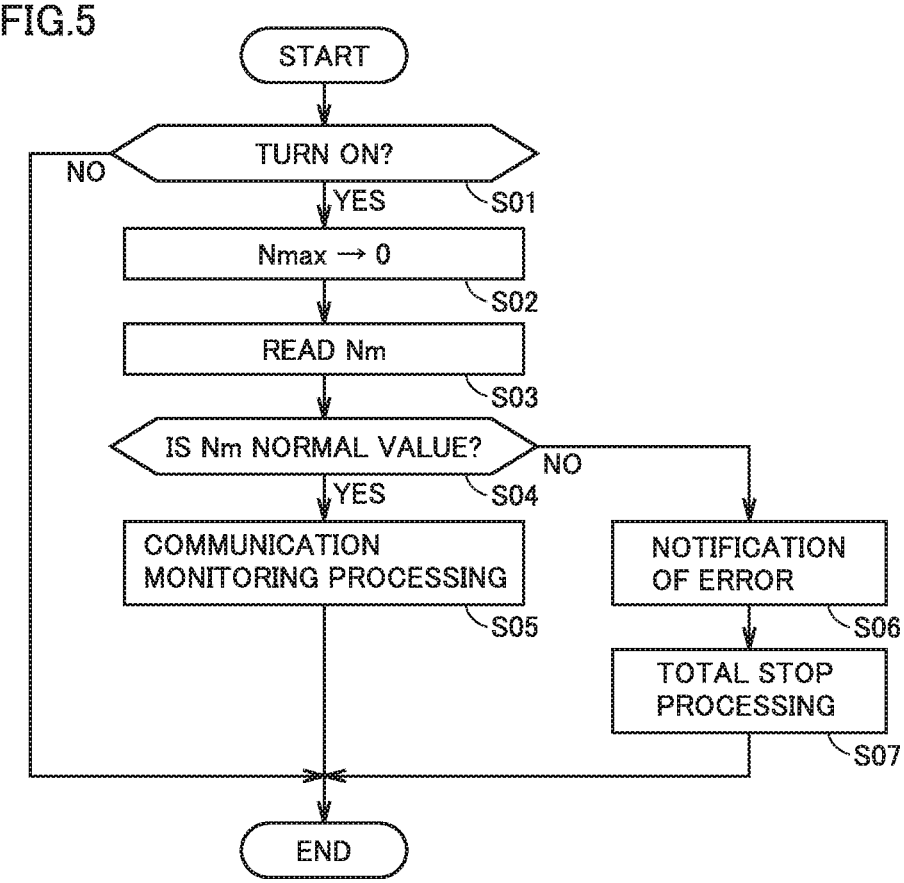
FIG. 5 is a flowchart for illustrating the communication monitoring processing performed by the system controller of the water heating system according to the first embodiment.
Figure 6:
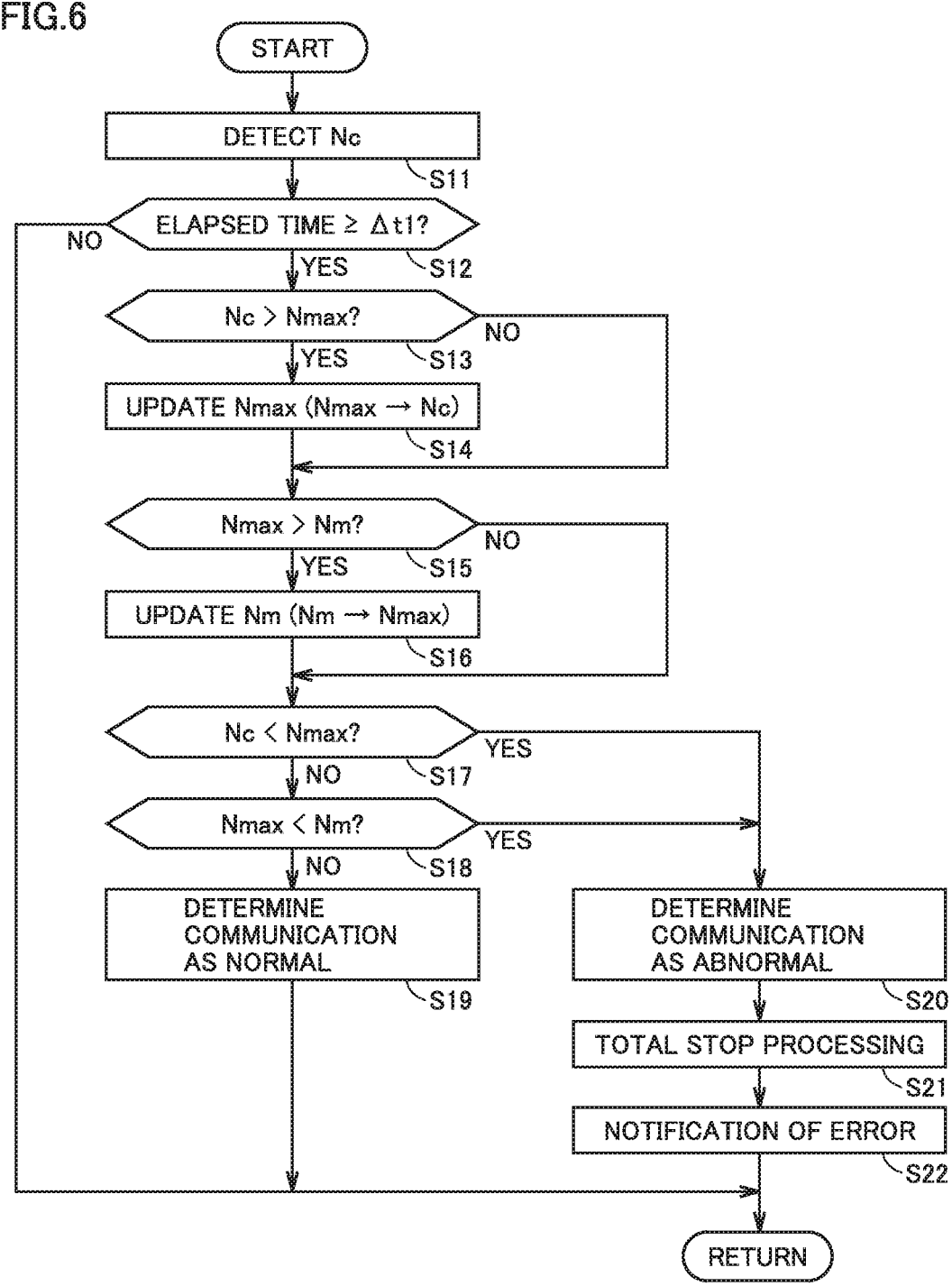
FIG. 6 is a flowchart illustrating details of the communication monitoring processing in step S05 in FIG. 5.

The communication monitoring processing in system controller SC described above can be summarized in flowcharts as shown in FIGS. 5 and 6.

Referring to FIG. 5, system controller SC determines in step S01 whether or not water heating system 100 has been turned on. When water heating system 100 has not been turned on (NO in S01), system controller SC skips subsequent steps and quits the process.

When water heating system 100 has been turned on (YES in S01), system controller SC initializes the maximum number of connected water heaters Nmax to a value "0" in step S02.

When system controller SC reads the stored number of water heaters Nm from storage unit 34 in step S03, it determines in step S04 whether or not the stored number of water heaters Nm is normal. When the stored number of water heaters Nm is normal (YES in S04), the process proceeds to step S05 and system controller SC performs the communication monitoring processing. When the stored number of water heaters Nm is not normal (NO in S04), system controller SC has remote controller RC give a notification of an error indicating an abnormal condition of storage unit 34 in step S06. System controller SC further performs the total stop processing in step S07.

FIG. 6 is a flowchart illustrating details of the communication monitoring processing in step S05 in FIG. 5. Referring to FIG. 6, system controller SC detects in step S11 the number of currently connected water heaters Nc based on the number of response signals input to terminals T1 to Tn+2 within a certain period of time since transmission of signals for checking connection.

System controller SC determines in step S12 whether or not time elapsed since turn-on is equal to or longer than prescribed period of time Δt1. When the elapsed time is shorter than prescribed period of time Δt1 (NO in S12), system controller SC skips subsequent steps and quits the process.

When the elapsed time is equal to or longer than prescribed period of time Δt1 (YES in S12), the process proceeds to step S13 and system controller SC determines whether or not the number of currently connected water heaters Nc detected in step S11 is greater than the maximum number of connected water heaters Nmax. When relation of Nc>Nmax is satisfied (YES in S13), system controller SC updates the maximum number of connected water heaters Nmax to the number of currently connected water heaters Nc in step S14. When relation of Nc≤Nmax is satisfied (NO in S13), processing in step S14 is skipped.

In succession, system controller SC determines in step S15 whether or not the maximum number of connected water heaters Nmax is greater than the stored number of water heaters Nm. When relation of Nmax>Nm is satisfied (YES in S15), system controller SC updates the stored number of water heaters Nm to the maximum number of connected water heaters Nmax in step S16. When relation of Nmax Nm is satisfied (NO in S15), processing in step S16 is skipped.

System controller SC compares the number of currently connected water heaters Nc and the maximum number of connected water heaters Nmax with each other in step S17. When relation of Nc<Nmax is satisfied (YES in S17), system controller SC determines in step S20 that an abnormal condition in communication has occurred between system controller SC and controller C of any water heater WH. Specifically, system controller SC determines that an abnormal condition in communication has occurred in any of Nmax water heaters WH with which communication was established.

In contrast, when relation of Nc≥Nmax is satisfied (NO in S17), system controller SC compares the maximum number of connected water heaters Nmax and the stored number of water heaters Nm with each other in step S18. When relation of Nmax<Nm is satisfied (YES in S18), system controller SC determines in step S20 that an abnormal condition in communication has occurred between system controller SC and controller C of any water heater WH. Specifically, system controller SC determines that an abnormal condition in communication has occurred by the time of turn-on in any of Nm water heaters WH with which communication was established before turn-on.

When it is determined in step S20 that an abnormal condition in communication has occurred, system controller SC performs the total stop processing in step S21 and has remote controller RC give a notification of an error indicating an abnormal condition in communication in step S22.

When relation of Nmax Nm is satisfied (NO in S18), system controller SC determines in step S19 that communication between system controller SC and controller C of each water heater WH is normal.

As described above, according to the water heating system in the present first embodiment, an abnormal condition in communication between system controller SC and controller C of each water heater WH can reliably be sensed by monitoring a state of communication between system controller SC and controller C of each water heater WH by using the stored number of water heaters stored in the storage unit in a non-volatile manner. Therefore, reliability and safety of the water heating system can be improved.

Second Embodiment

A maintenance work of any water heater WH of water heaters WH1 to WHn may be required while water heating system 100 shown in FIG. 1 is on. For example, when a failure in communication is found in a water heater WHi (i being an integer satisfying a condition of 1≤i<n), in order to investigate a cause of the failure in communication, a serviceperson may temporarily disconnect water heater WHi from a terminal Ti and connect the same to terminal Tn+1 which has not been used.

In communication monitoring processing performed in parallel to such change in connection, system controller SC transmits a signal for checking connection from each of terminals Ti and Tn+1. Then, the system controller does monitoring for response signals to the signals which are transmitted to terminals Ti and Tn+1 for a certain period of time (for example, two minutes) since transmission of the signals.

System controller SC confirms that terminal Ti is open after stand-by for the certain period of time (two minutes) since transmission of the signals. Therefore, a response signal may be received at terminal Tn+1 within this certain period of time. In this case, system controller SC may erroneously determine that one water heater WH was additionally provided, and consequently the maximum number of connected water heaters Nmax is updated from "n" to "n+1".

When the maximum number of connected water heaters Nmax is updated, the stored number of water heaters Nm is also updated. If determination as an abnormal condition in communication is made by using the updated maximum number of connected water heaters Nmax and the stored number of water heaters Nm, water heating system 100 may erroneously totally be turned off.

In water heating system 100 according to a second embodiment, a mode for prohibiting update of the maximum number of connected water heaters Nmax and determination as to an abnormal condition in communication in communication monitoring processing for a certain period of time for a maintenance work is provided. In the description below, such a mode is also referred to as a "service mode."

Figure 7:
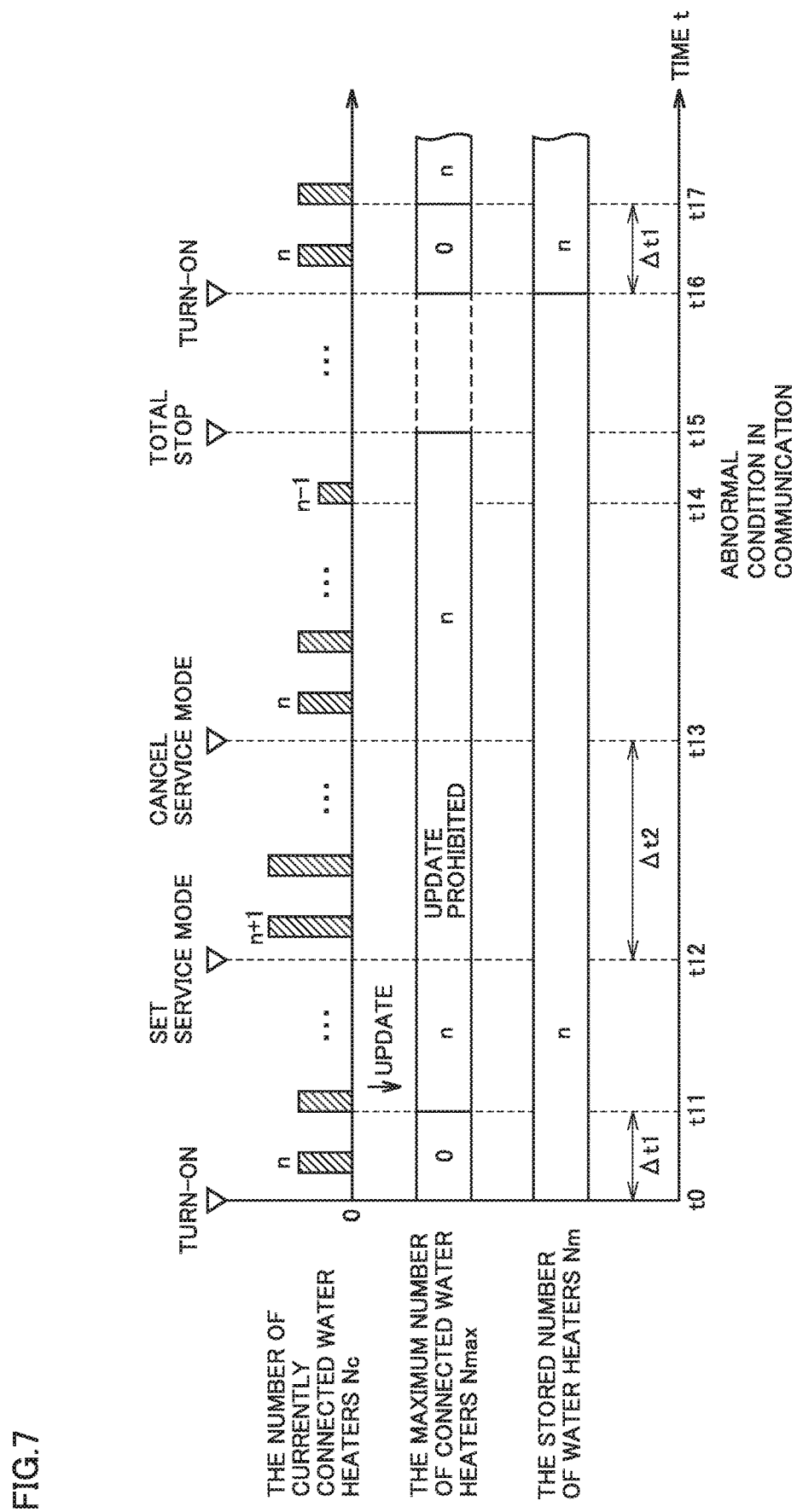
FIG. 7 is a time chart for illustrating the communication monitoring processing performed by the system controller of the water heating system according to a second embodiment.

FIG. 7 is a time chart for illustrating communication monitoring processing performed by system controller SC of the water heating system according to the second embodiment.

Referring to FIG. 7, when water heating system 100 is turned on at time t0, supply of electric power to system controller SC and controller C of each water heater WH is started. When system controller SC and controllers C1 to Cn are started up, system controller SC and each of controllers C1 to Cn can bidirectionally communicate with each other.

Monitoring unit 32 detects the number of currently connected water heaters Nc based on the number of response signals received at terminals T1 to Tn+2 every prescribed cycle. In water heating system 100 according to the second embodiment, it is assumed that n water heaters WH1 to WHn are connected to system controller SC as in FIG. 4.

At time t11 after lapse of prescribed period of time Δt1 since time to, monitoring unit 32 updates the maximum number of connected water heaters Nmax from the initial value of 0 to "n" representing the maximum value of the number of currently connected water heaters Nc. Monitoring unit 32 has storage unit 34 store the maximum number of connected water heaters Nmax. Since the stored number of water heaters Nm read from storage unit 34 at time t0 is "n" in the example in FIG. 7, the stored number of water heaters Nm is not updated at time t11 but remains at the value "n".

An example in which water heating system 100 is set to the service mode as a result of acceptance of an operation instruction (a first operation instruction) from a serviceperson by remote controller RC at time t12 after time t11 is assumed.

In this case, update of the maximum number of connected water heaters Nmax is prohibited during a certain period of time Δt2 from time t12. Therefore, even when the number of currently connected water heaters Nc increases from "n" to "n+1" as a result of temporary change in connection of water heater WH of interest of the work from terminal Ti to another terminal Tn+1, the maximum number of connected water heaters Nmax is not updated to "n+1" but remains at "n". Therefore, the stored number of water heaters Nm also remains at "n".

During certain period of time Δt2, determination as to an abnormal condition in communication based on the number of currently connected water heaters Nc, the maximum number of connected water heaters Nmax, and the stored number of water heaters Nm is also prohibited. The total stop processing can thus be prevented from being erroneously performed during the maintenance work. Therefore, the maintenance work can be performed without cutting off the power supply of water heating system 100.

Update of the maximum number of connected water heaters Nmax is prohibited during certain period of time Δt2 from time t12. Therefore, even though connection of a terminal is changed during a period of Δt2, determination as an abnormal condition in communication based on such change is not made during Δt2.

System controller SC can automatically cancel the service mode at time t13 after lapse of certain period of time Δt2 since t12. Thus, even if the serviceperson fails to give an operation instruction for quitting the service mode, return to the communication monitoring processing can automatically be made.

Alternatively, even before lapse of certain period of time Δt2 since time t12, when remote controller RC accepts an operation instruction (a second operation instruction) from the serviceperson, system controller SC can forcibly cancel the service mode. In this case, system controller SC cancels the service mode after it stands by for a prescribed period of time after the time point of acceptance of the second operation instruction. The prescribed period of time is set, for example, to approximately two minutes. By doing so, erroneous update of the maximum number of connected water heaters Nmax from "n" to "n+1" immediately after return to the communication monitoring processing due to connection of water heater WHi back from terminal Tn+1 to original terminal Ti immediately before cancelation of the service mode can be prevented.

A default value (an initial value) for certain period of time Δt2 may be set, and the serviceperson may be permitted to extend or shorten the period of time during the service mode by using remote controller RC. Then, the serviceperson can adjust a duration of the service mode in accordance with progress of work. When adjusted period of time Δt2 has elapsed, the service mode is automatically canceled and convenience of the serviceperson can be improved.

In the example in FIG. 7, when the service mode is automatically canceled at time t13, update of the maximum number of connected water heaters Nmax and determination as to an abnormal condition in communication are permitted. When relation of Nc<Nmax (that is, Nc<Nm) is satisfied at time t14 after time t13, monitoring unit 32 determines that an abnormal condition in communication has occurred and performs total stop processing (time t15). When water heating system 100 is again turned on at time t16 after time t15, the stored number of water heaters Nm is read from storage unit 34. The maximum number of connected water heaters Nmax is updated at time t17 after lapse of prescribed period of time Δt1 since time t16.

Figure 8:
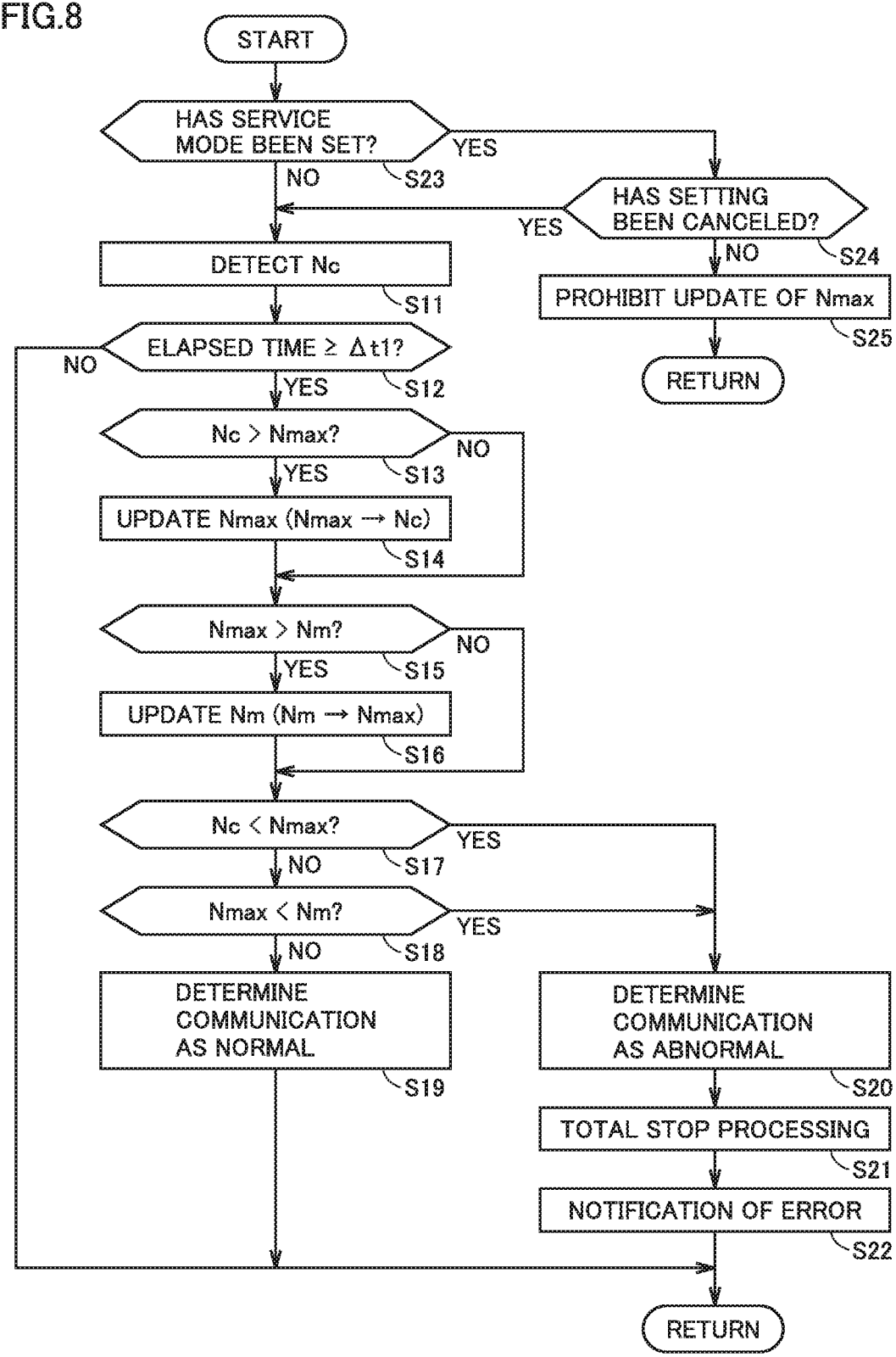
FIG. 8 is a flowchart for illustrating the communication monitoring processing performed by the system controller of the water heating system according to the second embodiment.

The communication monitoring processing in system controller SC described above can be summarized in the flowchart as shown in FIG. 8.

FIG. 8 is a flowchart illustrating details of the communication monitoring processing in step S05 in FIG. 5 and compared with FIG. 6. The flowchart in FIG. 8 is the same as the flowchart in FIG. 6 to which steps S23 to S25 are added.

Referring to FIG. 8, system controller SC determines in step S23 whether or not water heating system 100 has been set to the service mode. When the water heating system has not been set to the service mode (NO in S23), the process proceeds to step S11 as in FIG. 6 and system controller SC detects the number of currently connected water heaters Nc.

When the service mode has been set (YES in S23), system controller SC determines in step S24 whether or not the setting has been canceled. When the setting has not been canceled (NO in S24), that is, when the service mode is being executed, system controller SC prohibits update of the maximum number of connected water heaters Nmax in step S25. Update of the stored number of water heaters Nm is thus also prohibited.

As described above, according to the water heating system in the present second embodiment, update of the maximum number of connected water heaters Nmax and determination as to an abnormal condition in communication are prohibited during the service mode. Therefore, total stop processing can be prevented from being erroneously performed during the maintenance work. Therefore, the maintenance work can be performed without turning off the water heating system.

Third Embodiment

In water heating system 100 shown in FIG. 1, in order to decrease the number of water heaters WH to be used, stop of use of at least one water heater WH of water heaters WH1 to WHn may be desired. In such a case, by closing an air supply port of air supply duct 14 of water heater WH of which use is desirably stopped, a backflow of exhaust from exhaust duct assembly 3 through this water heater WH can be prevented even though that water heater WH is off.

On the other hand, however, water heater WH which is not used is unable to communicate with system controller SC. Therefore, in the communication monitoring processing described above, the number of currently connected water heaters Nc decreases. Since the maximum number of connected water heaters Nmax is smaller than the stored number of water heaters Nm, the stored number of water heaters Nm is not updated. Therefore, relation of Nmax<Nm (that is, Nc<Nm) is satisfied, and consequently it is determined that an abnormal condition in communication has occurred and total stop processing is performed.

In water heating system 100 according to the present third embodiment, a mode for initializing the number of water heaters WH which are used is provided. Such a mode is also referred to as an "initialization mode" in the description below. Upon acceptance by remote controller RC of a prescribed operation instruction (a third operation instruction) from a user, water heating system 100 can be set to the initialization mode.

In the initialization mode, even when the number of currently connected water heaters Nc is smaller than the maximum number of connected water heaters Nmax and the stored number of water heaters Nm, the maximum number of connected water heaters Nmax and the stored number of water heaters Nm can exceptionally be updated with the number of currently connected water heaters Nc. Thus, when the number of water heaters WH to be used is desirably decreased, the stored number of water heaters Nm can be rewritten to the decreased number of water heaters to be used in storage unit 34. Since determination as to an abnormal condition in communication is made by using the updated stored number of water heaters Nm, water heating system 100 can be prevented from being erroneously totally turned off.

Figure 9:
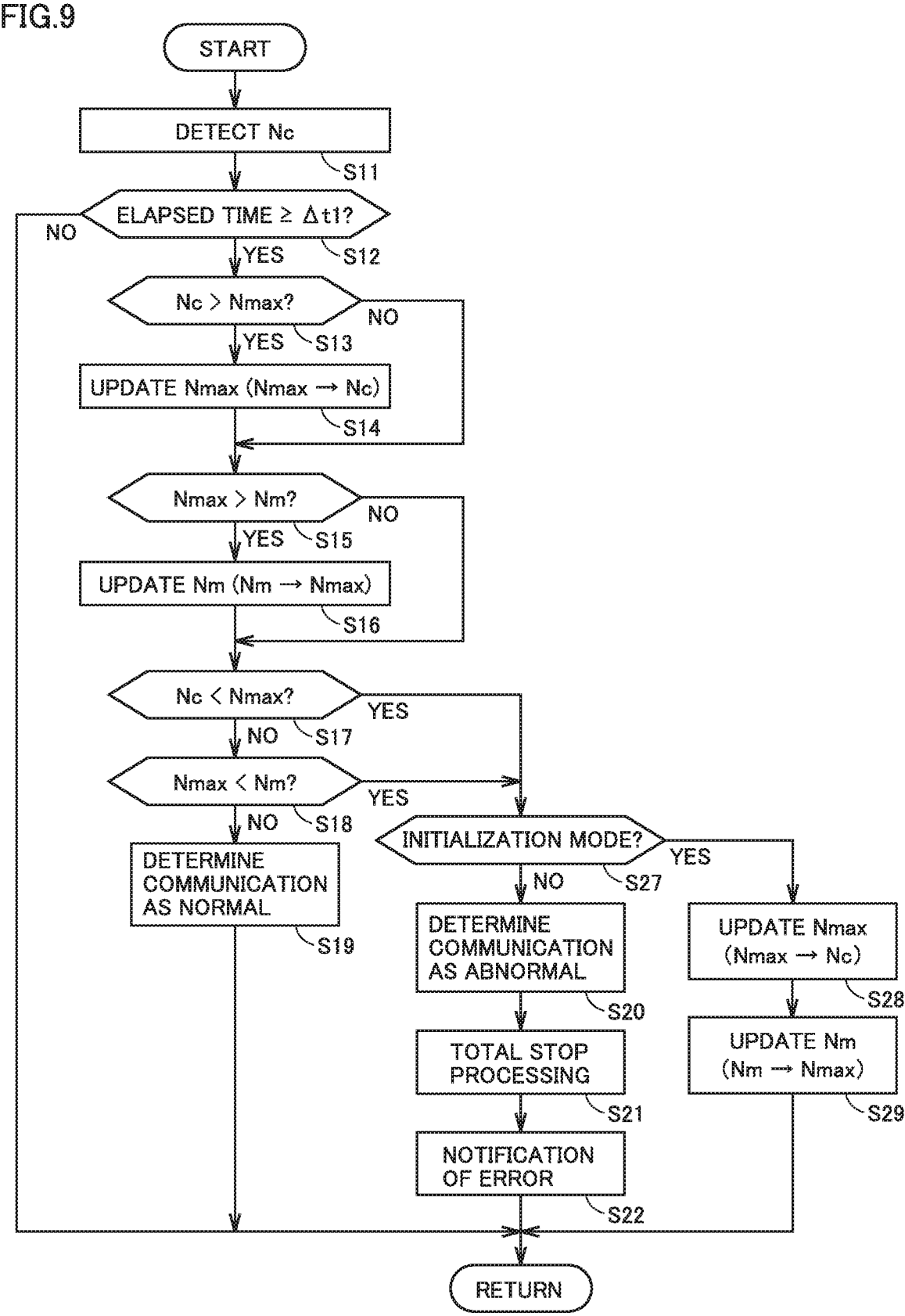
FIG. 9 is a flowchart for illustrating the communication monitoring processing performed by the system controller of the water heating system according to a third embodiment.

FIG. 9 is a flowchart for illustrating the communication monitoring processing in step S05 in FIG. 5 and compared with FIG. 6. The flowchart in FIG. 9 is the same as the flowchart in FIG. 6 to which steps S27 to S29 are added.

Referring to FIG. 9, when relation of Nc<Nmax is satisfied in step S17 (YES in S17) or when relation of Nmax<Nm is satisfied in step S18 (YES in S18), system controller SC determines in step S27 whether or not water heating system 100 has been set to the initialization mode. When water heating system 100 has not been set to the initialization mode (NO in S27), system controller SC determines in step S20 that an abnormal condition in communication has occurred between system controller SC and controller C of any water heater WH.

When water heating system 100 has been set to the initialization mode (YES in S27), system controller SC updates in step S28 the maximum number of connected water heaters Nmax to the number of currently connected water heaters Nc. System controller SC further updates in step S29 the stored number of water heaters Nm to the maximum number of connected water heaters Nmax.

As described above, according to the water heating system in the present third embodiment, when the number of water heaters to be used is desirably decreased, in the mode for initializing the number of water heaters to be used, the stored number of water heaters Nm can be rewritten to the decreased number of water heaters to be used. Thus, since determination as to an abnormal condition in communication is made by using the updated stored number of water heaters Nm, the water heating system can be prevented from being erroneously totally turned off.

Fourth Embodiment

Though a configuration in which system controller SC obtains information on the number of water heaters WH with which communication has currently been established as information on water heater WH with which communication has currently been established is described in the first to third embodiments above, a configuration in which information for identifying water heater WH with which communication has currently been established is obtained as information on water heater WH with which communication has currently been established will be described in a fourth embodiment.

For example, an apparatus number (water heater No. 1, water heater No. 2, . . . , and water heater No. n) allocated to each water heater WH in advance or a model number of each water heater WH can be used as information for identifying water heater WH.

Figure 10:
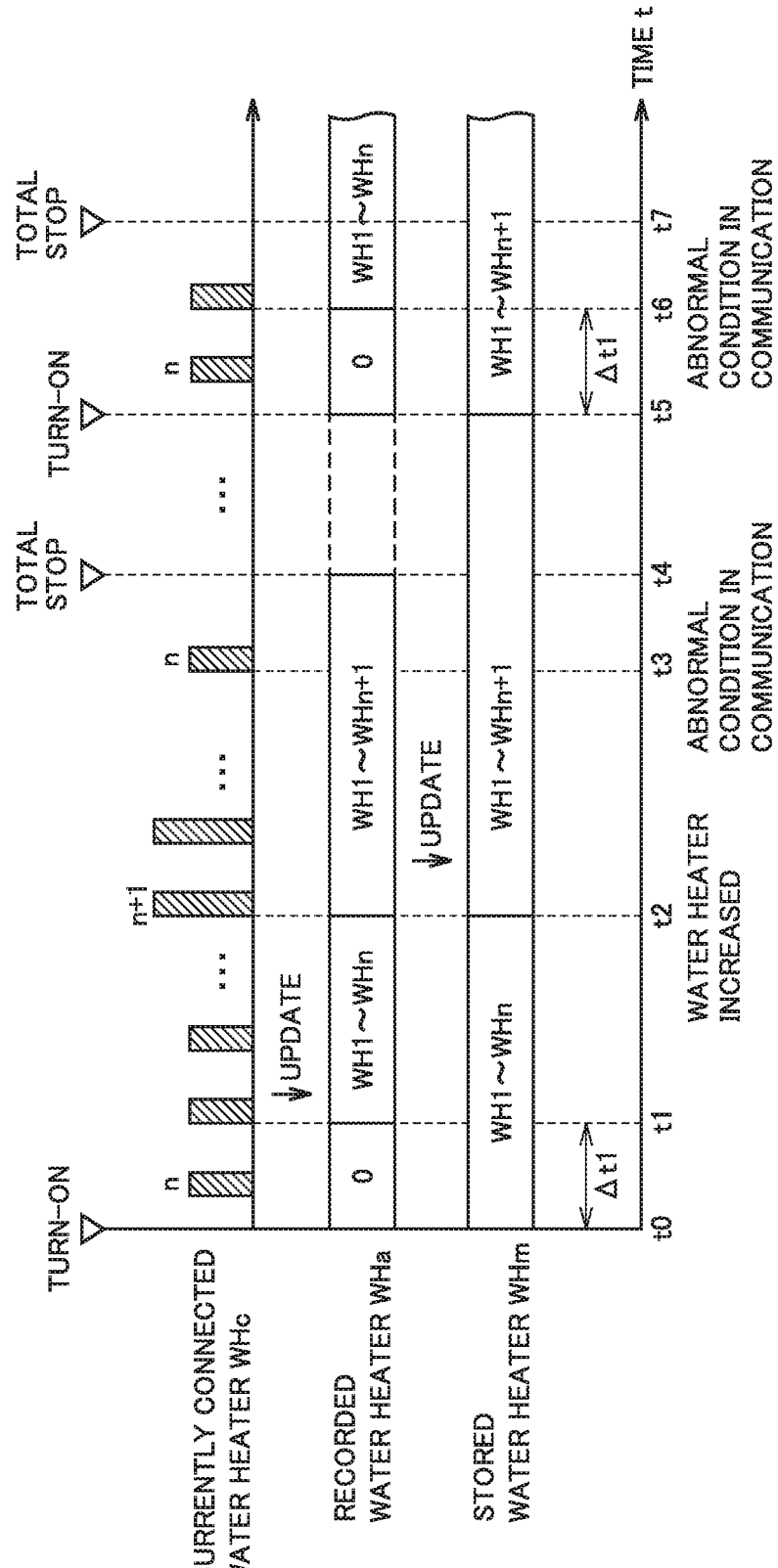
FIG. 10 is a time chart for illustrating the communication monitoring processing performed by the system controller of the water heating system according to a fourth embodiment.

FIG. 10 is a time chart for illustrating the communication monitoring processing performed by system controller SC of water heating system 100 according to the fourth embodiment. Referring to FIG. 10, when water heating system 100 is turned on at time t0, supply of electric power to system controller SC and controller C of each water heater WH is started. When system controller SC and controllers C1 to Cn are started up, system controller SC and each of controllers C1 to Cn can bidirectionally communicate with each other.

In the present fourth embodiment, monitoring unit 32 detects water heater WH with which communication has currently been established based on response signals received at terminals T1 to Tn+2 every prescribed cycle. In the description below, water heater WH with which communication has currently been established is denoted as a "currently connected water heater WHc."

In the example in FIG. 10, it is assumed that n water heaters WH1 to WHn are connected to system controller SC. Currently connected water heater WHc is initialized (WHc=0) at time t0 at which water heating system 100 is turned on.

Monitoring unit 32 sets water heater WH with which establishment of communication has been recorded as a "recorded water heater WHa" based on currently connected water heater WHc periodically detected every prescribed cycle. Recorded water heater WHa is initialized at time t0 (WHa=0).

As shown in FIG. 10, "WH1 to WHn" are currently connected water heaters WHc at t0 or later. Therefore, at time t1 after lapse of prescribed period of time Δt1 since time t0, monitoring unit 32 updates recorded water heater WHa to currently connected water heaters "WH1 to WHn."

At the time of turn-on, recorded water heater WHa at the time point of previous turn-off is saved in storage unit 34 as a stored water heater WHm. Upon turn-on, monitoring unit 32 reads stored water heater WHm from storage unit 34. Monitoring unit 32 can check certainty of read stored water heater WHm. When stored water heater WHm at time t0 is not normal, monitoring unit 32 has remote controller RC give a notification of an error indicating an abnormal condition of storage unit 34 and performs total stop processing.

In the example in FIG. 10, "WH1 to WHn" represent stored water heater WHm read from storage unit 34 at time t0. Therefore, stored water heater WHm is not updated at time t1 but remains as "WH1 to WHn."

An example in which one water heater WH is additionally provided in water heating system 100 at time t2 after time t1 is assumed. In this case, system controller SC has the (n+1)th terminal Tn+1 (see FIG. 3) connected to controller Cn+1 of water heater WHn+1 through communication line Ln+1.

When the specific signal described above is exchanged by means of monitoring unit 32 in this state, currently connected water heater WHc is changed from "WH1 to WHn" to "WH1 to WHn+1" in response to reception of a response signal at terminal Tn+1. Therefore, recorded water heater WHa is also changed from "WH1 to WHn" to "WH1 to WHn+1."

When recorded water heater WHa is updated, monitoring unit 32 updates stored water heater WHm to recorded water heater WHa. In the example in FIG. 10, stored water heater WHm is updated from "WH1 to WHn" to "WH1 to WHn+1" in response to update of recorded water heater WHa at time t2.

In FIG. 10, such an abnormal condition in communication as failure in communication with controller C of one water heater WH (for example, water heater WH1) among water heaters WH1 to WHn+1 occurs at time t3 after time t2. Thus, currently connected water heater WHc decreases from "WH1 to WHn+1" to "WH2 to WHn+1" at time t3.

Recorded water heater WHa remains as "WH1 to WHn+1" at time t3. Therefore, stored water heater WHm also remains as "WH1 to WHn+1."

Thus, when water heating system 100 is turned on, currently connected water heater WHc is detected based on establishment of communication every prescribed cycle, and when the number of detected currently connected water heaters WHc increases (time t2), recorded water heater WHa is updated. Recorded water heater WHa represents water heater WH with which establishment of communication has been recorded.

Storage unit 34 has a function to store water heater WH with which establishment of communication has been recorded in a non-volatile manner. Therefore, stored water heater WHm read from storage unit 34 at the time of turn-on (time t0) represents water heater WH with which establishment of communication has been recorded before turn-on.

When the number of recorded water heaters WHa increases after turn-on (time t2), stored water heater WHm is updated to recorded water heater WHa. When the number of water heaters WH with which establishment of communication has been recorded increases, water heater WH with which establishment of communication has been recorded is rewritten in storage unit 34.

Monitoring unit 32 monitors a state of communication between system controller SC and controller C of each water heater WH based on currently connected water heater WHc and stored water heater WHm. Specifically, monitoring unit 32 compares currently connected water heater WHc and stored water heater WHm with each other. When currently connected water heater WHc does not match with stored water heater WHm (WHc # WHm), monitoring unit 32 determines that an abnormal condition in communication has occurred between system controller SC and controller C of any water heater WH. Currently connected water heater WHc not matching with stored water heater WHm (WHc≠WHm) indicates occurrence of an abnormal condition in communication in any of a plurality of water heaters WH with which communication was established.

Since recorded water heater WHa and stored water heater WHm are not updated until lapse of prescribed period of time Δt1 since turn-on, monitoring unit 32 makes determination as to an abnormal condition of communication described above on condition that prescribed period of time Δt1 or longer has elapsed since turn-on.

In the example in FIG. 10, relation of WHc≠WHm is satisfied at time t3. Therefore, monitoring unit 32 determines that an abnormal condition in communication has occurred and performs total stop processing (time t4). When water heating system 100 is again turned on at time t5 after time t4, stored water heater WHm is read from storage unit 34. Recorded water heater WHa is updated at time t6 after lapse of prescribed period of time Δt1 since time t5.

At time t6 or later, monitoring unit 32 again monitors a state of communication between system controller SC and controller C of each water heater WH based on currently connected water heater WHc and stored water heater WHm. In the example in FIG. 10, relation of WHc≠WHm is satisfied at time t6. Therefore, monitoring unit 32 determines that an abnormal condition in communication has occurred and performs total stop processing (time t7).

FIG. 11 is a flowchart for illustrating the communication monitoring processing performed by system controller SC of water heating system 100 according to the fourth embodiment. Referring to FIG. 11, system controller SC detects in step S31 currently connected water heater WHc based on response signals input to terminals T1 to Tn+2 within a certain period of time after transmission of signals for checking connection.

System controller SC determines in step S32 whether or not elapsed time since turn-on is equal to or longer than prescribed period of time Δt1. When elapsed time is shorter than prescribed period of time Δt1 (NO in S32), system controller SC skips subsequent steps and quits the process.

When elapsed time is equal to or longer than prescribed period of time Δt1 (YES in S32), the process proceeds to step S33 and system controller SC determines whether or not the number of currently connected water heaters WHc detected in step S31 is greater than the number of recorded water heaters WHa. When relation of WHc>WHa is satisfied (YES in S33), system controller SC updates in step S34 recorded water heater WHa to currently connected water heater WHc. When relation of WHc≤WHa is satisfied (NO in S33), the processing in step S34 is skipped.

In succession, system controller SC determines in step S35 whether or not the number of recorded water heaters WHa is greater than stored water heater WHm. When relation of WHa>WHm is satisfied (YES in S35), system controller SC updates in step S36 stored water heater WHm to recorded water heater WHa. When relation of WHa≤WHm is satisfied (NO in S35), the processing in step S36 is skipped.

System controller SC compares in step S37 currently connected water heater WHc and recorded water heater WHa with each other. When relation of WHc≠WHm is satisfied (YES in S37), system controller SC determines in step S39 that an abnormal condition in communication has occurred between system controller SC and controller C of any water heater WH.

When it is determined in step S39 that an abnormal condition in communication has occurred, system controller SC performs total stop processing in step S40 and has remote controller RC give a notification of an error indicating an abnormal condition in communication in step S41.

When relation of WHc=WHm is satisfied (NO in S37), system controller SC determines in step S38 that communication between system controller SC and controller C of each water heater WH is normal.

As described above, according to the water heating system in the present fourth embodiment, a state of communication between system controller SC and controller C of each water heater is monitored by using a stored water heater stored in the storage unit in a non-volatile manner. Thus, even though an abnormal condition in communication has already occurred by the time of turn-on of water heating system 100, such an abnormal condition in communication can be sensed. Therefore, since an abnormal condition in communication between system controller SC and controller C of each water heater WH can reliably be sensed, reliability and safety of water heating system 100 can be improved.

Setting of the service mode shown in the second embodiment described above can be applied also to the water heating system according to the fourth embodiment. Thus, update of recorded water heater WHa and determination as to an abnormal condition in communication are prohibited during the service mode. In the water heating system according to the fourth embodiment, by applying setting of the initialization mode shown in the third embodiment described above, stored water heater WHm can be rewritten to thereby delete water heater WH which will not be used when the number of water heaters to be used is desirably decreased.

Though embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A water heating system comprising:
a plurality of water heaters of which exhaust paths are connected in common to an exhaust path assembly;
a control device configured for centralized control of the plurality of water heaters; and
a non-volatile storage unit accessible from the control device,
each of the plurality of water heaters including a control unit configured to control a hot water supply operation based on communication with the control device,
the non-volatile storage unit being configured to store information on a water heater of which control unit is recorded to have established communication with the control device, and
the control device being configured to turn off all of the plurality of water heaters when information on a water heater of which control unit has currently established communication with the control device does not match with the information stored in the non-volatile storage unit; wherein
the non-volatile storage unit is configured to store information on the number of water heaters of which control units are recorded to have established communication with the control device, and
the control device is configured to turn off all of the plurality of water heaters when the number of water heaters of which control units have currently established communication with the control device is smaller than the number stored in the non-volatile storage unit.

2. The water heating system according to claim 1, the water heating system further comprising an operation portion configured to accept an external operation instruction, wherein
when the operation portion accepts a first operation instruction, the control device is configured to prohibit turn-off of all of the plurality of water heaters based on unmatch of the information on the water heater of which control unit has currently established communication with the control device with the information stored in the non-volatile storage unit.

3. The water heating system according to claim 2, wherein
the control device is configured to cancel prohibition when a prescribed period of time has elapsed since acceptance of the first operation instruction by the operation portion, and
when the operation portion accepts a second operation instruction while the control device prohibits turn-off of all of the plurality of water heaters, the control device is further configured to change the prescribed period of time in response to the second operation instruction.

4. The water heating system according to claim 1, the water heating system further comprising an operation portion configured to accept an external operation instruction, wherein
when the operation portion accepts a third operation instruction, the control device is configured to update the information stored in the non-volatile storage unit to the information on the water heater of which control unit has currently established communication with the control device.

5. A water heating system comprising:
a plurality of water heaters of which exhaust paths are connected in common to an exhaust path assembly;
a control device configured for centralized control of the plurality of water heaters; and
a non-volatile storage unit accessible from the control device,
each of the plurality of water heaters including a control unit configured to control a hot water supply operation based on communication with the control device,
the non-volatile storage unit being configured to store information on a water heater of which control unit is recorded to have established communication with the control device,
the control device being configured to turn off all of the plurality of water heaters when information on a water heater of which control unit has currently established communication with the control device does not match with the information stored in the non-volatile storage unit; and
an operation portion configured to accept an external operation instruction, wherein
when the operation portion accepts a first operation instruction, the control device is configured to prohibit turn-off of all of the plurality of water heaters based on unmatch of the information on the water heater of which control unit has currently established communication with the control device with the information stored in the non-volatile storage unit, and wherein
the control device is configured to cancel prohibition when a prescribed period of time has elapsed since acceptance of the first operation instruction by the operation portion, and
when the operation portion accepts a second operation instruction while the control device prohibits turn-off of all of the plurality of water heaters, the control device is further configured to change the prescribed period of time in response to the second operation instruction.

6. A water heating system comprising:
a plurality of water heaters of which exhaust paths are connected in common to an exhaust path assembly;
a control device configured for centralized control of the plurality of water heaters; and
a non-volatile storage unit accessible from the control device,
each of the plurality of water heaters including a control unit configured to control a hot water supply operation based on communication with the control device,
the non-volatile storage unit being configured to store information on a water heater of which control unit is recorded to have established communication with the control device, the control device being configured to turn off all of the plurality of water heaters when information on a water heater of which control unit has currently established communication with the control device does not match with the information stored in the non-volatile storage unit, and an operation portion configured to accept an external operation instruction, wherein the non-volatile storage unit is configured to store information for identifying the water heater of which control unit is recorded to have established communication with the control device, the control device is configured to turn off all of the plurality of water heaters when the water heater of which control unit has currently established communication with the control device does not match with the water heater stored in the non-volatile storage unit, when the operation portion accepts a first operation instruction, the control device is configured to prohibit turn-off of all of the plurality of water heaters based on unmatch of the information on the water heater of which control unit has currently established communication with the control device with the information stored in the non-volatile storage unit, and wherein the control device is configured to cancel prohibition when a prescribed period of time has elapsed since acceptance of the first operation instruction by the operation portion, and when the operation portion accepts a second operation instruction while the control device prohibits turn-off of all of the plurality of water heaters, the control device is further configured to change the prescribed period of time in response to the second operation instruction.

* * * * *